Oct. 22, 1957 J. C. HANNA 2,810,191
METHOD OF PRESTRESSING METAL PLATES
Filed June 25, 1956 2 Sheets-Sheet 1
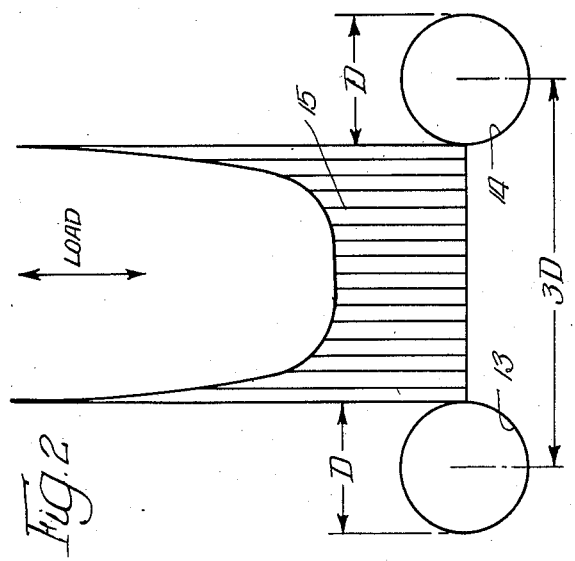
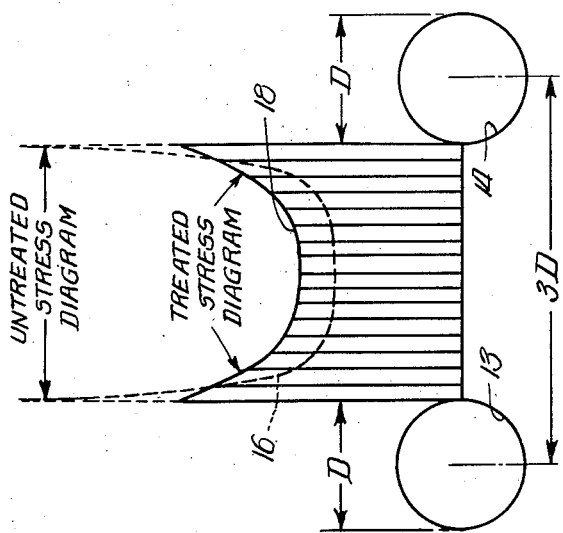
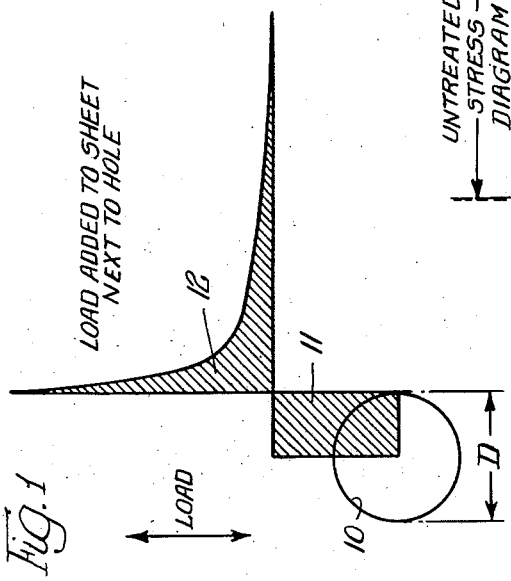
INVENTOR.
John C Hanna,
BY

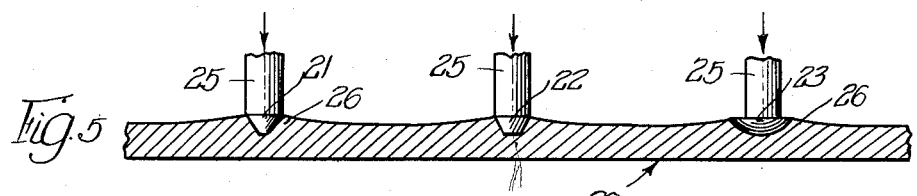
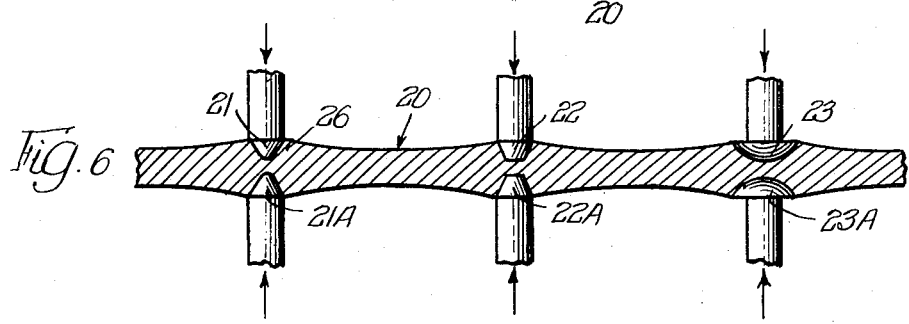
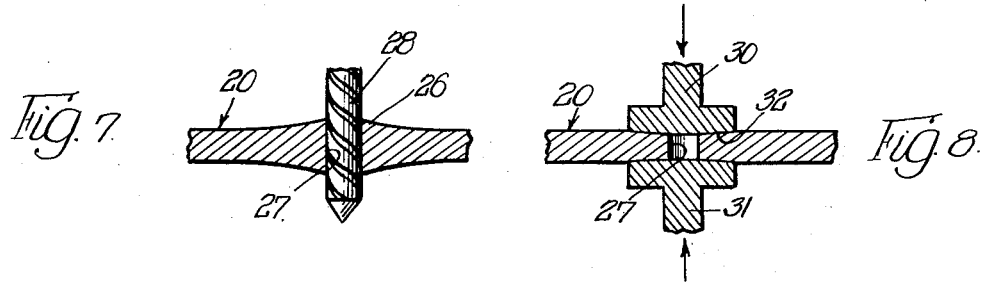
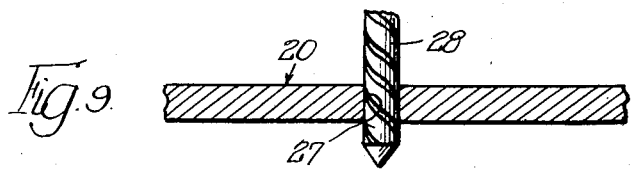
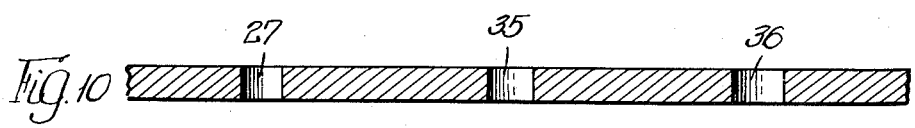

United States Patent Office 2,810,191
Patented Oct. 22, 1957

2,810,191

METHOD OF PRESTRESSING METAL PLATES

John C. Hanna, Chicago, Ill., assignor to Hanna Engineering Works, Chicago, Ill., a corporation of Illinois Application June 25, 1956, Serial No. 593,484

3 Claims. (Cl. 29—556)

The invention relates generally to a new and improved method of increasing the fatigue strength of metal adjacent to joint fastener holes and has reference more particularly to a unique method utilizing standard tools for indenting or brinelling the metal prior to the finishing of the final holes in the metal, whereby, after said holes have been completely formed, a metal sheet is obtained of greater strength and having greater resistance to fatigue than if the metal had not been so prestressed.

The present method finds extensive application in the manufacture of modern aircraft due to the many structural units and assemblies included in the construction of such aircraft and which are held together by fasteners such as rivets, bolts, pins or variations of the same. The increase in speed of modern airplanes has resulted in such an increase in the weight and complexities of the structure that the problem of fastening and holding the aircraft together is accordingly receiving serious study. Efforts have been made to develop stronger alloys for the structure and for the fasteners. Also better methods have been devised for machining the parts to insure closer and more accurate interfitting relation thereof. The invention relates to the fastening problem as herein outlined and provides a novel and improved method for prestressing structural metal plates prior to the finishing of the rivet or bolt holes therein to their final size, whereby to give the metal plates greater structural strength and greater resistance to fatigue.

Accordingly, one of the main objects of the invention is to improve the strength and resistance to fatigue of a metal plate prior to the complete formation of the rivet or bolt holes therein by providing a method of prestressing the metal of the plate whereby to spread or distribute the stress over a broader area and thus reduce the peak stress adjacent the hole locations.

A further object of the invention is to provide a method for the purposes described which will involve a cold elastic and plastic displacement of the metal prior to the drilling, reaming, broaching or other finishing procedures on the holes in the plate so that the usual stress distribution adjacent the final holes is altered to give an improved stress distribution when the joint is loaded, whereby to provide a much lower maximum stress concentration and stronger structure.

A more specific object of the invention resides in the provision of a method which obtains reductions in peak stress concentrations by a cold straining technique involving the displacement of metal by means of dies or the like forced into the metal plates from one or both sides thereof.

Another object of the invention is to provide a prestressing method as above described which will include two distinct steps, first, the indenting or brinelling of the metal plate by dies of selected shape, and secondly, the coining or flattening of the resulting upraised fishtail of metal produced by the die impression to further improve the desired prestressing effects.

A more specific object of the invention is to provide a method for prestressing a metal plate at spaced locations prior to completion of the finished holes at said locations, which will comprise the steps of indenting or brinelling of the metal plate by dies of selected shape, the drilling of holes in the plate at the intended locations as formed by the dies, flattening of the plate at the hole locations to render the plate uniform in thickness, and the final step of finishing the holes to their desired size by a drilling, reaming or broaching operation.

With these and various other objects in view, the invention may consist of certain novel features of construction and operation as will be more fully described and particularly pointed out in the specification, drawings and claims appended thereto.

In the drawings which illustrate an embodiment of the invention, and wherein like reference characters are used to designate like parts—

Figure 1 is a diagram illustrating load exchange when a hole is placed in an infinite sheet;

Figure 2 is a diagram showing stress concentrations between two holes in the sheet at a spacing of three times the hole diameter;

Figure 3 is a diagram similar to Figure 2 but showing reduced stress concentrations between the two holes when the sheet has been prestressed according to the invention;

Figure 4 is a sectional view showing a metal plate prior to subjecting the same to the prestressing operations of the invention;

Figure 5 is a view illustrating the plate of Figure 1 in the operation of being prestressed by dies of various shapes;

Figure 6 is a view similar to Figure 5 but illustrating the action of dies in prestressing a metal plate on both sides thereof;

Figure 7 is a fragmentary sectional view showing the step of drilling a hole at one of the prestressed locations in the plate of Figure 6;

Figure 8 is a fragmentary sectional view showing the action of other dies in flattening the plate following the formation of the hole or holes therein;

Figure 9 is a fragmentary sectional view illustrating the last operation in reaming, drilling, or broaching the hole to the proper size; and Figure 10 is a sectional view showing the plate of Figure 6 with holes therein of finished size at the several prestressed locations.

Reference is made to the drawings, and particularly to Figure 1, which illustrates the elastic stress distribution at one side of a hole when the hole 10 is formed by any conventional means in a wide sheet of metal. The area 11 represents the load if no holes were present. When a hole is introduced this load is shifted to area 12 which is a peaked stress area adjacent to the hole with maximum value of three times the unit value elsewhere in the sheet. This assumes that the diameter of the hole is less than one-fifth the width of the plate. When multiple holes are made in a sheet normal to the direction of loading, with a spacing of three times the diameter of the holes, a stress distribution such as shown in Figure 2 results. The spaced holes are represented by numerals 13 and 14 and the stress distribution by the shaded area 15. The maximum stress is usually somewhat greater than three times the average stress. It is obvious that stress concentrations of three times normal make for structures which are weaker than those structures wherein the stress concentration adjacent to holes are reduced at least thirty-three and one-third percent below a factor of three.

It is possible to improve the strength and resistance to fatigue of a metal plate prior to the formation of holes therein by prestressing the metal of the plate so as to spread or redistribute the stress over a broader area and thereby reduce the peak stresses adjacent the hole locations. Figure 3 is a view which graphically illustrates such redistribution of the stresses between two holes, in a metal plate, the said holes having a spacing of three times their diameter. The usual stress concentrations between the spaced holes for an untreated plate are shown by the dotted lines 16, whereas the stress distribution between the same holes for a treated plate is shown by full lines 18. It must be remembered that the total load 15 remains the same whether the plate has been pretreated or not, or whether holes exist therein. The object is to keep the stress concentration peaks as low as possible and spread the load given up by the hole areas as uniformly as possible over the rest of the area. By so doing not only is the structure made stronger prior to permanent set, but even better fatigue improvement is obtained.

The method of obtaining such reductions in peak stresses includes a cold straining technique involving the displacement of metal by means of dies or similar tools which are forced into the metal of the plate from one side thereof or from both sides. Figure 4 shows a metal plate 20 which is to be subjected to the metal prestressing operations of the invention, said plate having substantially uniform thickness throughout its area and it will also be observed that said plate has top and bottom surfaces which are flat throughout their extent. As best shown in Figure 5, various forms or configurations for the dies may be used. For example, the die numbered 21 is cone-shaped, whereas die 22 is best described as having the shape of a truncated cone. Die 23 is semi-circular. In each case the handle or shank portion 25 is formed integral with the die proper. It will be understood that other forms or configurations of dies may be employed, the one important fact being that the metal of the plate must be displaced outwardly, that is, radially from under the die. This radial outward displacement of the metal from under the die produces the raised fishtail of metal indicated by numeral 26.

Instead of indenting the metal plate on only one surface it is entirely possible and may be preferred that the metal plate be indented at the hole locations on both top and bottom surfaces thereof. Accordingly, dies are employed which work in opposition to each other. The dies 20, 22 and 23 for indenting the top surface of the plate are duplicated in dies 21A, 22A and 23A for indenting the bottom surfaces. In each case the dies enter the metal plate sufficiently to displace some of the metal radially outwardly and upwardly whereby to form a raised fishtail of metal such as 26 surrounding the die impression. As a result of the die impressions the metal thus displaced is under considerable stress and strain. However, the increased thickness in metal resulting in the raised fishtails 26 is not responsible for the strength increase which is achieved. The fishtail is merely incidental.

After the dies have worked the metal of the plate at the hole locations, the proper size holes are made in the plate by any of the conventional ways such as by drilling or by punching. The holes should be substantially concentric with the axis of their respective indentations as made by the dies. Also it will be understood that the indenting dies are sized so that the maximum diameter of the indentations at the work surface is just slightly smaller than the desired hole. As the hole is being formed in the metal, the stress pattern is somewhat rearranged although the majority of the stresses in the metal surrounding the hole, imprisoned or prevented from complete elastic recovery by the plastic flow of the metal outward from the indentation, remain to keep the metal in the immediate vicinity of the hole prestressed in compression. The residual plastic change after drilling is much more important insofar as the desired results are concerned than the elastic change after drilling. A work sheet is thus obtained with much greater strength and resistance to fatigue than one having the same holes but which has not been prestressed.

The hole forming step in the present method is accordingly illustrated in Figure 7, wherein it will be observed that a drill 28 or the like is employed for drilling the hole such as 27 in the plate 20 at the indented locations. The hole is drilled to the fianl size desired therefor. However, due to the next operation, which consists in flattening of the plate 20, the size of the hole 27 is considerably reduced. This flattening operation is illustrated in Figure 8 wherein the opposed dies 30 and 31 are provided with slightly convex surfaces such as 32 and which are employed for flattening the raised fishtails 26 having surrounding relation with the drilled opening. The metal which was previously displaced in the formation of the fishtail is accordingly forced radially inward toward the circular opening 27, with the result that the size of the opening is materially reduced.

In Figure 9 the plate 20 is subjected to a finishing operation in order that the hole or holes previously bored therein may be brought back to the desired final size. Accordingly, a drill, reamer or broaching tool, such as 28, is employed for the last operation on the hole 27 and as a result thereof the openings such as 27, 35 and 36 of the desired size are produced in the plate at the hole locations as determined by the indenting operations of the dies.

It is recognized that the metal displaced radially by both plastic flow and elastic movement must result in change in the form of the plate and which takes place in the thickening of the plate. If the movement of the metal is entirely elastic and is thus able to recover completely to its original form, the process has accomplished nothing. That portion of the change in the form of the plate that is plastic, and thus does not recover, acts for improvement in the plate for use in joint strength to oppose joint load. It follows that if in the drilling of the hole or in the subsequent reaming or broaching operations all of the plasticly deformed metal is removed, the method will not accomplish those results which are desired. The plasticly deformed metal that remains after drilling goes into compression to balance the elasticly deformed metal and which is thus prevented from complete recovery. The flattening of the raised fishtails of metal immediately surrounding the openings increases the deforming of the metal radially. In this respect it augments the good of the process. There is another virtue in the flattening operation which is that the plate has a better appearance immediately surrounding the holes. Also by resorting to a flattening of the plate less sealing compound is required to seal those joints which must be leakproof.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. A method of strengthening a metal plate adapted to have holes formed therein, said method additionally improving the fatigue resistance of such a plate, the steps including indenting the plate at the hole locations by forcing a die into the plate at the locations, whereby the metal is forced radially outwardly from under each die and is placed under considerable stress and strain, and whereby the thickness of the plate is increased around the die impressions as a result of said radially outward flow of metal, forming the holes in the plate at said prestressed locations, flattening the plate around each hole in order to obtain approximately uniform plate thickness and to additionally improve the prestressing of the metal surrounding each hole, and then enlarging each hole to its final diameter by a finishing operation.

2. In a method of strengthening a metal plate adapted to have holes formed therein, said method additionally improving the fatigue resistance of such a plate, the steps including indenting the plate on both sides thereof at the hole locations by forcing dies into the plate at said locations, whereby the metal is forced radially outwardly from under each die and is placed under considerable stress and strain, and whereby the thickness of the plate around the die impressions is increased by said radially outward flow of metal, drilling the plate at said prestressed locations to form holes therein, flattening the plate around each hole in order to obtain approximately uniform plate thickness and to additionally improve the prestressing of the metal surrounding each hole, and then enlarging each hole to its final diameter by a drilling, reaming or broaching operation.

3. A method as defined by claim 2, wherein the holes formed in the plate have a diameter slightly larger than the maximum diameter of the respective indentations made by the dies.

References Cited in the file of this patent

UNITED STATES PATENTS

| | | |
|---|---|---|
| 1,269,220 | Sanders | June 11, 1918 |
| 1,784,866 | Farnenwald | Dec. 16, 1930 |